(12) United States Patent
McAlpine et al.

(10) Patent No.: US 10,480,131 B1
(45) Date of Patent: Nov. 19, 2019

(54) SYSTEM AND METHOD FOR CONTROLLING PAVING MACHINE SPEED

(71) Applicant: Caterpillar Paving Products Inc., Brooklyn Park, MN (US)

(72) Inventors: Jacob J. McAlpine, Otsego, MN (US); John L. Marsolek, Watertown, MN (US); Nicholas A. Oetken, Brooklyn Park, MN (US); Timothy M. O'Donnell, Long Lake, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 16/023,107

(22) Filed: Jun. 29, 2018

(51) Int. Cl.
 *E01C 19/48* (2006.01)
 *E01C 19/10* (2006.01)
 *E01C 19/00* (2006.01)

(52) U.S. Cl.
 CPC ........ *E01C 19/1063* (2013.01); *E01C 19/004* (2013.01); *E01C 19/48* (2013.01)

(58) Field of Classification Search
 CPC ..... E01C 19/004; E01C 19/48; E01C 19/1063
 USPC .................. 404/72, 75, 84.05, 118
 See application file for complete search history.

(56) References Cited

U.S. PATENT DOCUMENTS

| | | | |
|---|---|---|---|
| 8,099,218 B2* | 1/2012 | Glee | E01C 19/004 106/271 |
| 8,894,323 B2 | 11/2014 | Rutz et al. | |
| 8,930,092 B2* | 1/2015 | Minich | E01C 23/07 701/50 |
| 9,481,964 B1 | 11/2016 | Marsolek | |
| 9,611,595 B2* | 4/2017 | Marsolek | E01C 19/1063 |
| 9,759,708 B2* | 9/2017 | Marsolek | G01N 33/42 |
| 9,879,386 B2 | 1/2018 | Marsolek | |
| 10,001,783 B2* | 6/2018 | Zahr | G05D 1/0293 |
| 2008/0292398 A1 | 11/2008 | Potts | |
| 2012/0263531 A1 | 10/2012 | Rutz et al. | |
| 2013/0189032 A1 | 7/2013 | Bellerose et al. | |
| 2013/0290062 A1 | 10/2013 | Patel et al. | |
| 2017/0010621 A1 | 1/2017 | Rio et al. | |

FOREIGN PATENT DOCUMENTS

WO 2013040769 3/2013

\* cited by examiner

*Primary Examiner* — Raymond W Addie
(74) *Attorney, Agent, or Firm* — Lee & Hayes, PLLC (57) ABSTRACT

A method includes determining a delivery rate of paving material being delivered from a paving material plant to a worksite, and determining a plurality of paving machine speeds, wherein at least one speed of the plurality of paving machine speeds is determined based on the delivery rate. The method also includes determining a desired paving machine speed based on a lowest speed of the plurality of paving machine speeds, and causing a paving machine to travel at the desired paving machine speed while depositing paving material on a work surface of the worksite.

20 Claims, 3 Drawing Sheets

SYSTEM AND METHOD FOR CONTROLLING PAVING MACHINE SPEED

TECHNICAL FIELD

The present disclosure relates to a paving system. More specifically, the present disclosure relates to a paving system including a control system configured to determine an optimal speed of a paving machine based on worksite information, paving system information, and/or environmental information.

BACKGROUND

Haul trucks, paving machines, compaction machines, and other paving equipment are often used to perform a variety of tasks associated with a worksite. For example, one or more haul trucks may be used to transport paving material from a paving material plant to a worksite so that the paving material can be distributed along a work surface of the worksite by one or more paving machines. One or more compaction machines may follow behind the paving machine, and may be operable to compact the freshly-laid paving material to a desired density or stiffness. The operation of such machines must be coordinated in order to perform paving operations in an efficient manner. In particular, the quality of a mat of paving material deposited by the paving machine may be maximized when the paving machine is controlled to operate at a relatively constant speed, and without stoppages caused by an inadequate supply of paving material being delivered to the worksite, slow compaction rates of the compaction machines, or other factors.

An example system for coordinating the activities of paving machines is described in U.S. Patent Application Publication No. 2013/0290062 (hereinafter referred to as the '062 reference). In particular, the '062 reference describes a system for implementing a computer-based method of coordinating activities associated with paving a roadway. The '062 reference describes, for example, a server configured to provide communication among system components. As explained in the '062 reference, the server may receive a communication from a transport truck indicating that a batch of paving material has been delivered to the roadway, and such a communication may be generated automatically by a truck computer system in conjunction with a global positioning system (GPS) receiver on the truck. The '062 reference does not, however, describe controlling operation of a paving machine based on dynamic conditions associated with the paving worksite such that stoppages of the paving machine can be avoided. As a result, the consistency and quality of the mat of paving material deposited by the machines described in the '062 reference may suffer.

Example embodiments of the present disclosure are directed toward overcoming the deficiencies described above.

SUMMARY

In an example embodiment of the present disclosure, a method includes determining, with a controller, a delivery rate of paving material being delivered from a paving material plant to a worksite remote from the paving material plant, and determining, with the controller, a plurality of paving machine speeds, wherein at least one speed of the plurality of paving machine speeds is determined based on the delivery rate. The method also includes determining, with the controller, a desired paving machine speed based on a lowest speed of the plurality of paving machine speeds, and causing a paving machine, disposed at the worksite, to travel at the desired paving machine speed while depositing paving material on a work surface of the worksite.

In another example embodiment of the present disclosure, a paving system includes a haul truck configured to transport paving material from a paving material plant to a worksite, a location sensor configured to determine a location of the haul truck, a paving machine disposed at the worksite and configured to receive paving material from the haul truck, a compaction machine following the paving machine at the worksite, and a system controller in communication with the location sensor via a network. In such examples, the system controller is configured to receive a signal from the location sensor, the signal including information indicating a location of the haul truck determined by the location sensor, determine, based on the signal, a delivery rate of paving material being delivered from the paving material plant to the worksite by the haul truck, and determine a plurality of paving machine speeds. In such examples, a first speed of the plurality of paving machine speeds is determined based on the delivery rate, a second speed of the plurality of paving machine speeds is determined based on a maximum compaction rate of the compaction machine, and a third speed of the plurality of paving machine speeds is determined based on a current paving material production rate of the paving material plant and corresponding to the worksite. In such examples, the system controller is also configured to determine a desired paving machine speed based on a lowest speed of the plurality of paving machine speeds, and provide the desired paving machine speed to a paving machine controller via the network. The paving machine controller is configured to cause the paving machine to travel at the desired paving machine speed while depositing paving material on a work surface of the worksite.

In yet another example embodiment of the present disclosure, a control system includes a location sensor configured to determine a location of a haul truck, a paving machine controller disposed on a paving machine located at a worksite, a system controller, and a network configured to transmit signals between the location sensor, the paving machine controller, and the system controller. In such examples, the system controller is configured to receive a signal from the location sensor and via the network, the signal including information indicating a location of the haul truck determined by the location sensor, determine, based on the signal, a delivery rate of paving material being delivered from a paving material plant to the worksite by the haul truck, and determine a plurality of paving machine speeds, wherein at least one speed of the plurality of paving machine speeds is determined based on the delivery rate. In such examples, the system controller is also configured to determine a desired paving machine speed based on a lowest speed of the plurality of paving machine speeds, and provide the desired paving machine speed to the paving machine controller via the network. The paving machine controller is configured to cause the paving machine to travel at the desired paving machine speed while depositing paving material on a work surface of the worksite.

DETAILED DESCRIPTION

Figure 1:
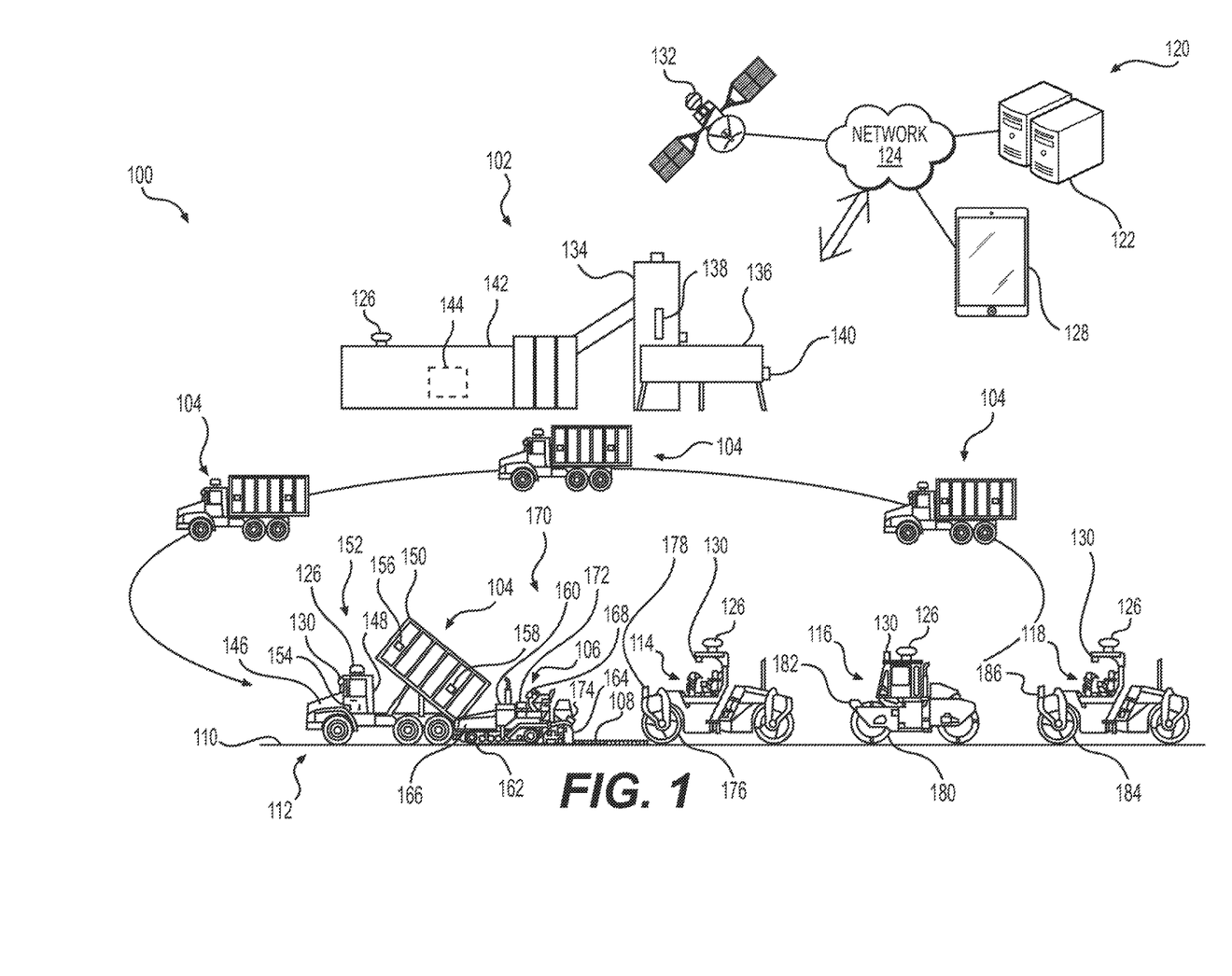
FIG. 1 is a schematic illustration of a paving system in accordance with an example embodiment of the present disclosure.

Wherever possible, the same reference numbers will be used throughout the drawings to refer to the same or like parts. Referring to FIG. 1, an example paving system 100 may include one or more paving material plants 102, and a plurality of machines such as one or more haul trucks 104 and/or one or more paving machines 106. For example, the paving material plant 102 may include various equipment configured to heat, produce, sense, store, and/or transfer paving material 108 such as asphalt. For instance, one or more haul trucks 104 may be loaded with a desired amount of paving material 108 at the paving material plant 102. The one or more haul trucks 104 may be configured to travel along various travel paths extending from the paving material plant 102 to, for example, a work surface 110 of a worksite 112, and/or to the worksite 112 generally. Such travel paths may include one or more partially or completely formed roads, highways, bridges, service roads, or other surfaces passable by construction and/or paving machines, and such an example worksite 112 may include, for example, a construction site, a roadworksite, a parking lot, or any other type of job site. Once a haul truck 104 has delivered the paving material 108 to the worksite 112, the haul truck 104 may transfer the paving material 108 to a hopper or other component of the paving machine 106, and the paving machine 106 may apply the paving material 108 to and/or otherwise deposit the paving material 108 on the work surface 110 in the form of a substantially flat, substantially smooth paving material mat. The paving system 100 may also include one or more other machines, such as one or more compaction machines 114, 116, 118 and/or one or more remixing transfer vehicles (not shown). In such examples, the one or more compaction machines 114, 116, 118 may be configured to compact the mat of paving material 108 to a desired density. It is understood that the consistency, density, and/or quality of the mat of paving material may be maximized when the paving machine 106 is controlled to operate at a substantially constant speed, and without stopping. Accordingly, in order to avoid paving machine stoppages, embodiments of the present disclosure may be used to determine desired (e.g., optimal) paving machine speeds on a substantially continuous basis and in substantially real time. Controlling the paving machine to travel at such desired paving machine speeds may, thus, maximize the quality of the mat of paving material, thereby improving the overall efficiency of the paving system 100.

In example embodiments, the paving material plant 102 may produce paving material 108 such as asphalt from bitumen, aggregate, and other materials or fillers. The paving material 108 is often produced in batches with each batch stored or held in a separate storage or holding location, such as a silo, until it is loaded into a haul truck 104 at a loading station. Each holding location may be dedicated to storing or holding paving material 108 for a particular worksite 112 and paving material 108 within a particular holding location is periodically loaded into a haul truck 104 for transport to the worksite 112. The characteristics of each batch stored within a holding location may be set based upon the desired characteristics for a particular paving job. For example, the amount of oil and the size of the aggregate may be set based upon the desired characteristics of the paving material 108 and the requirements of each paving job.

Each batch may be periodically or continuously mixed at the holding location and maintained at a desired temperature. The temperature at which the paving material 108 is maintained may be set based upon a desired temperature at which the paving material 108 will be loaded into the haul trucks 104. Such loading temperature may be based upon the desired temperature at which the load will be delivered to the paving machine 106, the ambient temperature of the air, the expected time required for the haul truck 104 to drive from the paving material plant 102 to the paving machine 106, as well as any expected or anticipated waiting time for the haul truck 104 at the worksite 112.

The paving system 100 shown in FIG. 1 may also include a control system 120 and one or more system controllers 122. In some examples, the control system 120 and/or the system controller 122 may be located at the paving material plant 102. In such examples, the control system 120 and/or the system controller 122 may also include components located remotely from the paving material plant 102 such as on any of the machines of the paving system 100, at the worksite 112, and/or at a remote command center (not shown). In other examples, the control system 120 and/or the system controller 122 may be located remote from the paving material plant 102 and/or remoter from the worksite 112, such as at the remoter command center referred to above. In any of the examples described herein, the functionality of system controller 122 may be distributed so that certain operations are performed at the paving material plant 102 and other operations are performed remotely. For example, some operations of the system controller 122 may be performed at the worksite 112, on one or more of the haul trucks 104, on one or more of the paving machines 106, etc. It is understood that the system controller 122 may comprise a component of the paving system 100, the paving material plant 102, one or more of the haul trucks 104, one or more of the paving machines 106, one or more of the compaction machines 114, 116, 118, a component of a separate mobile device (e.g., a mobile phone, a tablet, a laptop computer, etc.), and/or the control system 120.

The system controller 122 may be an electronic controller that operates in a logical fashion to perform operations, execute control algorithms, store and retrieve data and other desired operations. The system controller 122 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the system controller 122 such as power supply circuitry, signal conditioning circuitry, driver circuitry, and other types of circuitry.

The system controller 122 may be a single controller or may include more than one controller (such as additional controllers associated with each of the haul trucks 104, paving machines 106, compaction machines 114, 116, 118, and/or other machines of the paving system 100) configured to control various functions and/or features of the paving system 100. As used herein, the term "controller" is meant in its broadest sense to include one or more controllers and/or microprocessors that may be associated with the paving system 100, and that may cooperate in controlling various functions and operations of the paving material plant 102 and the machines of the paving system 100. The functionality of the system controller 122 may be implemented in hardware and/or software without regard to the functionality. The system controller 122 may rely on one or more data maps relating to the operating conditions and the operating environment of the paving system 100 that may be stored in the memory of the system controller 122. Each of these data maps may include a collection of data in the form of tables, graphs, and/or equations to maximize the performance and efficiency of the paving system 100 and its operation.

The components of the control system 120 may be in communication with and/or otherwise operably connected to any of the components of the paving system 100 via a network 124. The network 124 may be a local area network ("LAN"), a larger network such as a wide area network ("WAN"), or a collection of networks, such as the Internet. Protocols for network communication, such as TCP/IP, may be used to implement the network 124. Although embodiments are described herein as using a network 124 such as the Internet, other distribution techniques may be implemented that transmit information via memory cards, flash memory, or other portable memory devices.

It is also understood that the paving material plant 102, the various haul trucks 104, paving machines 106, compaction machines 114, 116, 118 and/or other components of the paving system 100 may include respective controllers, and each of the respective controllers may be in communication and/or may otherwise be operably connected via the network 124. For example, the network 124 may comprise a component of a wireless communication system of the paving system 100, and as part of such a wireless communication system, the paving material plant 102, the one or more haul trucks 104, the paving machine 106, the one or more compaction machines 114, 116, 116, and/or other components of the paving system 100 may include respective communication devices 126. Such communication devices 126 may be configured to permit wireless transmission of a plurality of signals, instructions, and/or information between the paving material plant 102, the haul trucks 104, the paving machines 106, the compaction machines 114, 116, 118, and the system controller 122, as well as to permit communication with other machines and systems remote from the paving material plant 102, haul trucks 104, paving machines 106, compaction machines 114, 116, 118, and/or the worksite 112. For example, such communication devices 126 may include a transmitter configured to transmit signals to a receiver of one or more other such communication devices 126. In such examples, each communication device 126 may also include a receiver configured to receive such signals. In some examples, the transmitter and the receiver of a particular communication device 126 may be combined as a transceiver or other such component. In any of the examples described herein, such communication devices 126 may also enable communication with one or more tablets, computers, cellular/wireless telephones, personal digital assistants, mobile devices, or other electronic devices 128 located at the worksite 112, at the paving material plant 102, and/or remote from the worksite 112 or the paving material plant 102. Such electronic devices 128 may comprise, for example, mobile phones and/or tablets of project managers (e.g., foremen) overseeing daily paving operations at the worksite 112 and/or at the paving material plant 102.

The network 124, communication devices 126, and/or other components of the wireless communication system described above may implement or utilize any desired system or protocol including any of a plurality of communications standards. The desired protocols will permit communication between the system controller 122, one or more of the communication devices 126, and/or any other desired machines or components of the paving system 100. Examples of wireless communications systems or protocols that may be used by the paving system 100 described herein include a wireless personal area network such as Bluetooth® (e.g., IEEE 802.15), a local area network such as IEEE 802.11b or 802.11g, a cellular network, or any other system or protocol for data transfer. Other wireless communication systems and configurations are contemplated. In some instances, wireless communications may be transmitted and received directly between the control system 120 and a machine (e.g., a paving machine 106, a haul truck 104, etc.) of the paving system 100 or between such machines. In other instances, the communications may be automatically routed without the need for re-transmission by remote personnel.

In example embodiments, one or more machines of the paving system 100 (e.g., the one or more haul trucks 104, the paving machine 106, the one or more compaction machines 114, 116, 118, etc.) may include a location sensor 130 configured to determine a location and/or orientation of the respective machine. In such embodiments, the communication device 126 of the respective machine may be configured to generate and/or transmit signals indicative of such determined locations and/or orientations to, for example, the system controller 122 and/or to the other respective machines of the paving system 100. In some examples, the location sensors 130 of the respective machines may include and/or comprise a component of global navigation satellite system (GNSS) or a global positioning system (GPS). Alternatively, universal total stations (UTS) may be utilized to locate respective positions of the machines. In example embodiments, one or more of the location sensors 130 described herein may comprise a GPS receiver, transmitter, transceiver, laser prisms, and/or other such device, and the location sensor 130 may be in communication with one or more GPS satellites 132 and/or UTS to determine a respective location of the machine to which the location sensor 130 is connected continuously, substantially continuously, or at various time intervals. One or more additional machines of the paving system 100 may also be in communication with the one or more GPS satellites 132 and/or UTS, and such GPS satellites 132 and/or UTS may also be configured to determine respective locations of such additional machines. In any of the examples described herein, machine locations determined by the respective location sensors 130 may be used by the system controller 122 and/or other components of the paving system 100 to coordinate activities of the haul trucks 104, paving machine 106, compaction machines 114, 116, 118, and/or other components of the paving system 100. For example, machine locations determined by the respective location sensors 130 may be used by the system controller 122 and/or other components of the paving system 100 to determine delivery rates of paving material 108 being delivered to the worksite 112 from the paving material plant. Such machine locations may also be used by the system controller 122 and/or other components of the paving system 100 to determine one or more paving machine speeds (e.g., a desired paving machine speed). Such paving machine speeds may be useful to avoid stoppages of the paving machine 106 caused by, for example, an inadequate supply of paving material 108 being delivered to the worksite 112, slow compaction rates associated with one or more of the compaction machines 114, 116, 118, and/or other factors.

With continued reference to FIG. 1, the paving material plant 102 may include various material delivery components, mixers, heaters, and/or other equipment configured to assist in manufacturing paving material 108 for use in various paving operations. Such equipment may include, for example, one or more conveyors or other devices configured to transport paving material 108 to one or more paving material silos 134 or other holding locations for storage therein. The paving material plant 102 may also include one or more load stations 136 configured to transfer paving material 108 from the one or more paving material silos 134 to a haul truck 104. In such examples, a paving material silo 134 may include one or more sensors 138 configured to determine a temperature of paving material 108 stored within the paving material silo 134 and/or an amount of paving material 108 stored within the paving material silo 134 (e.g., a fill level of the paving material silo 134). Similarly, a load station 136 may include one or more sensors 140 configured to determine the presence and/or location of a haul truck 104, a time at which the haul truck 104 arrived at the load station 136, a time at which the haul truck 104 departed the load station 136, an amount (e.g., a weight) of paving material 108 loaded into the haul truck 104, and/or other operating parameters. In some examples, the sensor 140 may comprise a scale or other mass sensor configured to determine the weight of the haul truck 104 upon entering the load station 136, the weight of the haul truck 104 after paving material has been loaded into the haul truck 104, and/or a change in weight of the haul truck 104.

The paving material plant 102 may also include one or more scale houses, operator stations, or other stations 142 for use by paving material plant personnel. For example, as shown in phantom in FIG. 1, one or more such stations 142 may include a paving material plant controller 144 that is substantially similar to and/or the same as the system controller 122 described above. In some examples, the paving material plant controller 144 may comprise a component of the control system 120. In any of the examples described herein, the paving material plant controller 144 and/or other components of the paving material plant 102 may be configured to monitor, record, and/or communicate activities of the various haul trucks 104 entering and leaving the paving material plant 102. For example, the various sensors of the paving material plant 102 and/or the paving material plant controller 144 may monitor, sense, determine, record, and/or transmit information indicative of a time at which a particular haul truck 104 enters the paving material plant 102, a time at which the haul truck 104 leaves the paving material plant 102, the amount of paving material 108 loaded into the particular departing haul truck 104, the destination of the particular haul truck 104 (e.g., the location of the worksite 112) the operator of the haul truck 104, and/or other information. Such information may be used by, for example, the system controller 122 in any of the paving machine speed determinations and/or other operations described herein.

As noted above, the haul trucks 104 of the paving system 100 may be operative to transport paving material 108 between the paving material plant 102 and one or more of the paving machines 106 located at the worksite 112. Each haul truck 104 may include a chassis 146 that supports a prime mover, such as an engine, and a cab 148 in which an operator may be positioned to provide input instructions to operate the haul truck 104. The engine is operatively connected to and drives a ground engaging drive mechanism such as wheels. A material transport unit such as a dump body 150 is pivotally mounted on the chassis 146 and receives a payload (e.g., paving material 108) to be hauled from one location to another.

Each haul truck 104 may include a truck control system 152 and a truck controller 154 generally similar or identical to the control system 120 and the system controller 122, respectively. The truck control system 152 and the truck controller 154 may be located on the haul truck 104 and may also include components located remotely from the haul truck 104 such as on any of the other machines of the paving system 100, at the paving material plant 102, or at a command center (not shown). The functionality of truck controller 154 may be distributed so that certain functions are performed on the haul truck 104 and other functions are performed remotely. In some examples, the truck control system 152 and/or the truck controller 154 may enable autonomous and/or semi-autonomous control of the haul truck 104.

The haul truck 104 may also be equipped with a plurality sensors connected to and/or otherwise in communication with the truck controller 154 and/or with the system controller 122. Such sensors may be configured to provide data indicative (directly or indirectly) of various operating parameters of the haul truck 104, systems associated with the haul truck 104, and/or the worksite 112 and/or other environment in which the haul truck 104 is operating. In any of the examples described herein, such sensors may comprise components of the truck control system 152, the control system 120, and/or the paving system 100, generally. For example, as noted above, the haul truck 104 may be equipped with a location sensor 130 configured to sense, detect, and/or otherwise determine a location and/or orientation of the haul truck 104. The location sensor 138 may include a plurality of individual sensors that cooperate to generate and provide location signals to the truck controller 154 and/or to the system controller 122 indicative of the location and/or orientation of the haul truck 104. In some examples, the location sensor 130 may be fixed to the cab 148, the chassis 146, and/or any other component of the haul truck 104. In other examples, however, the location sensor 130 may be removably attached to the haul truck 104 and/or disposed within, for example, the cab 148 of the haul truck 104 during operation of the haul truck 104. In some examples, the haul truck 104 may also include a load sensor 156 configured to sense, measure, and/or otherwise determine the load or amount of paving material 108 disposed within the dump body 150. The haul truck 104 may further include a temperature sensor 158 configured to sense, measure, and/or otherwise determine the temperature of the load (e.g., paving material 108) within the dump body 150.

The paving machine 106 may include a frame 160 having a set of ground engaging wheels or tracks 162 mounted thereto, as well as a screed 164 for spreading paving material 108 across a width of the work surface 110. The paving machine 106 may further include a hopper 166 for storing paving material 108 supplied by the haul truck 104 or another supply machine, and a conveyor system which transfers paving material 108 from the hopper 166 to the screed 164. The paving machine 106 may further include a display 168, such as an LCD display. The display 168 may be mounted to the frame 160 for viewing by an operator. In an example embodiment, the display 168 may be configured to display a map of the worksite 112 including icons or other visual indicia representing the work surface 110, the paving machine 106, the haul truck 104, one or more of the compaction machines 114, 116, 118, and/or other components of the paving system 100.

The paving machine 106 may also include a paving machine control system 170 and a paving machine controller 172 generally similar or identical to the control system 120 and the system controller 122, respectively. The paving machine control system 170 and the paving machine controller 172 may be located on the paving machine 106 and may also include components located remotely from the paving machine 106 such as on any of the other machines of the paving system 100, at the paving material plant 102, or at a command center (not shown). The functionality of paving machine controller 172 may be distributed so that certain functions are performed on the paving machine 106 and other functions are performed remotely. In some examples, the paving machine control system 170 and/or the paving machine controller 172 may enable autonomous and/or semi-autonomous control of the paving machine 106. For example, the paving machine controller 172 may be configured to receive one or more paving machine speeds (e.g., one or more desired paving machine speeds) from the system controller 122. In an autonomous or semi-autonomous mode of operation, the paving machine controller 172 and/or the paving machine control system 170, generally, may be operable to cause the paving machine 106 to travel at one or more of the received paving machine speeds while depositing paving material 108 on the work surface 110 in accordance with parameters (e.g., a thickness, a width, etc.) a paving plan.

The paving machine 106 may also be equipped with a plurality sensors connected to and/or otherwise in communication with the paving machine controller 172 and/or with the system controller 122. Such sensors may be configured to provide data indicative (directly or indirectly) of various operating parameters of the paving machine 106, systems associated with the paving machine 106, and/or the worksite 112, and/or other environments in which the paving machine 106 is operating. In any of the examples described herein, such sensors may comprise components of the paving machine control system 170, the control system 120, and/or the paving system 100, generally. For example, in addition to the location sensor 130 and communication device 126 described above, the paving machine 106 may also include a temperature sensor 174 mounted, for example, on or proximate the screed 164. The temperature sensor 174 may be positioned and/or otherwise configured to determine the temperature of the mat of paving material 108 deposited on the work surface 110 by the screed 164. In some examples, the temperature sensor 174 may comprise an optical temperature sensor such as an infrared camera, whereas in other embodiments the temperature sensor 174 may comprise a non-optical sensor such as a digital or analog thermometer. While the temperature sensor 174 is shown mounted on the screed 164 such that it can determine the temperature of paving material 108 deposited on the work surface 110 and located behind the screed 164 as paving progresses, the present disclosure is not limited to this configuration. For example, in other embodiments the temperature sensor 174 may be mounted at a different location on the paving machine 106, and may be configured to sense paving material temperature within paving machine 106.

As noted above, the paving system 100 may include one or more compaction machines 114, 116, 118 configured to compact the mat of paving material 108 deposited by the paving machine 106. In some examples, the compaction machine 114 may comprise a "breakdown" compactor having a breakdown drum 176, and the compaction machine 114 may be configured to follow relatively closely behind the paving machine 106, such that the breakdown drum 176 can compact paving material 108 distributed by the paving machine 106 while the paving material 108 is still relatively hot. Compacting with the compaction machine 114 when the paving material 108 is still relatively hot allows the breakdown drum 176 of the compaction machine 114 to perform a relatively large proportion of the total compaction desired for a particular lift of paving material 108, as relatively hotter asphalt in the paving material 108 can flow relatively readily and is thus readily compacted. In an example embodiment, the compaction machine 114 may be used primarily to compact paving material 108 which has not yet cooled to a "tender zone" temperature range. In such an example, the "tender zone" is a temperature range at which the paving material 108 moves or shoves in front of the advancing compaction machine drum (e.g., the breakdown drum 176), making attempted compaction generally undesirable. The actual temperature range at which the paving material 108 will be within the tender zone will depend upon the particular paving material mix, and in some examples, the paving material 108 may enter the tender zone when the temperature is between about 115 degrees Celsius and about 135 degrees Celsius. In some examples, paving material 108 may be below the tender zone when its temperature falls to between about 65 degrees Celsius and about 95 degrees Celsius. Accordingly, it will typically be desirable to compact paving material 108 with the compaction machine 114 when the temperature is above this range.

In addition to the communication device 126 and the location sensor 130 described above, the compaction machine 114 may further include any number of additional sensors configured to assist the compaction machine 114 in performing various paving (e.g., compaction) tasks. For example, such sensors may include one or more accelerometers or vibration sensors configured to sense the level of vibration (e.g., impacts per foot) imparted by the breakdown drum 176. The compaction machine 114 may also include a temperature sensor 178 mounted thereon and configured to sense, measure, and/or otherwise determine a temperature of the paving material 108 with which the compaction machine 114 is interacting or with which it has interacted. In some examples, the temperature sensor 178 may be substantially similar to and/or the same as the temperature sensor 174 of the paving machine 106.

The compaction machine 116 may be substantially similar to and/or the same as the compaction machine 114. In some examples, the compaction machine 116 may comprise an "intermediate" compactor, and may include an intermediate drum 180 which compacts paving material 108 already compacted at least once by the compaction machine 114. It will typically be desirable to compact paving material 108 with the compaction machine 116 after the paving material 108 has cooled to a temperature below the tender zone. The compaction machine 116 may include a sensor or other device configured to sense a smoothness and/or stiffness of the paving material 108. Additionally, the compaction machine 116 may include the communication device 126 and the location sensor 130 described above, as well as any number of additional sensors configured to assist the compaction machine 116 in performing various paving (e.g., compaction) tasks. For example, such sensors may include one or more accelerometers or vibration sensors configured to sense the level of vibration (e.g., impacts per foot) imparted by the intermediate drum 180. The compaction machine 116 may also include a temperature sensor 182 mounted thereon and configured to sense, measure, and/or otherwise determine a temperature of the paving material 108 with which the compaction machine 116 is interacting or with which it has interacted. In some examples, the temperature sensor 182 may be substantially similar to and/or the same as the temperature sensor 174 of the paving machine 106.

The compaction machine 118 may also be substantially similar to and/or the same as the compaction machine 114. In some examples, the compaction machine 118 may comprise a "finishing" compactor, and may include a finish drum 184 configured to perform a final squeeze of the paving material 108. In such examples, the compaction machine 118 may be configured to follow relatively closely behind compaction machine 116. In some instances, it will be desirable to compact paving material 108 with the compaction machine 118 prior to its cooling below a temperature in the range of about 50 degrees Celsius to about 65 degrees Celsius. Even where the paving material 108 is compacted to a specified relative compaction state, if compaction takes place at too low of a temperature, the aggregate in the paving material 108 may crack, creating voids which can negatively impact the long term viability of the compacted surface. To this end, the compaction machine 118 may also include a temperature sensor 186 to verify whether the final compaction is taking place at an appropriate paving material temperature. As noted above with respect to the compaction machines 114, 116, the compaction machine 118 may also include a communication device 126 and a location sensor 130, as well as any number of additional sensors configured to assist the compaction machine 118 in performing various paving (e.g., compaction) tasks. For example, such sensors may include one or more accelerometers or vibration sensors.

Figure 2:
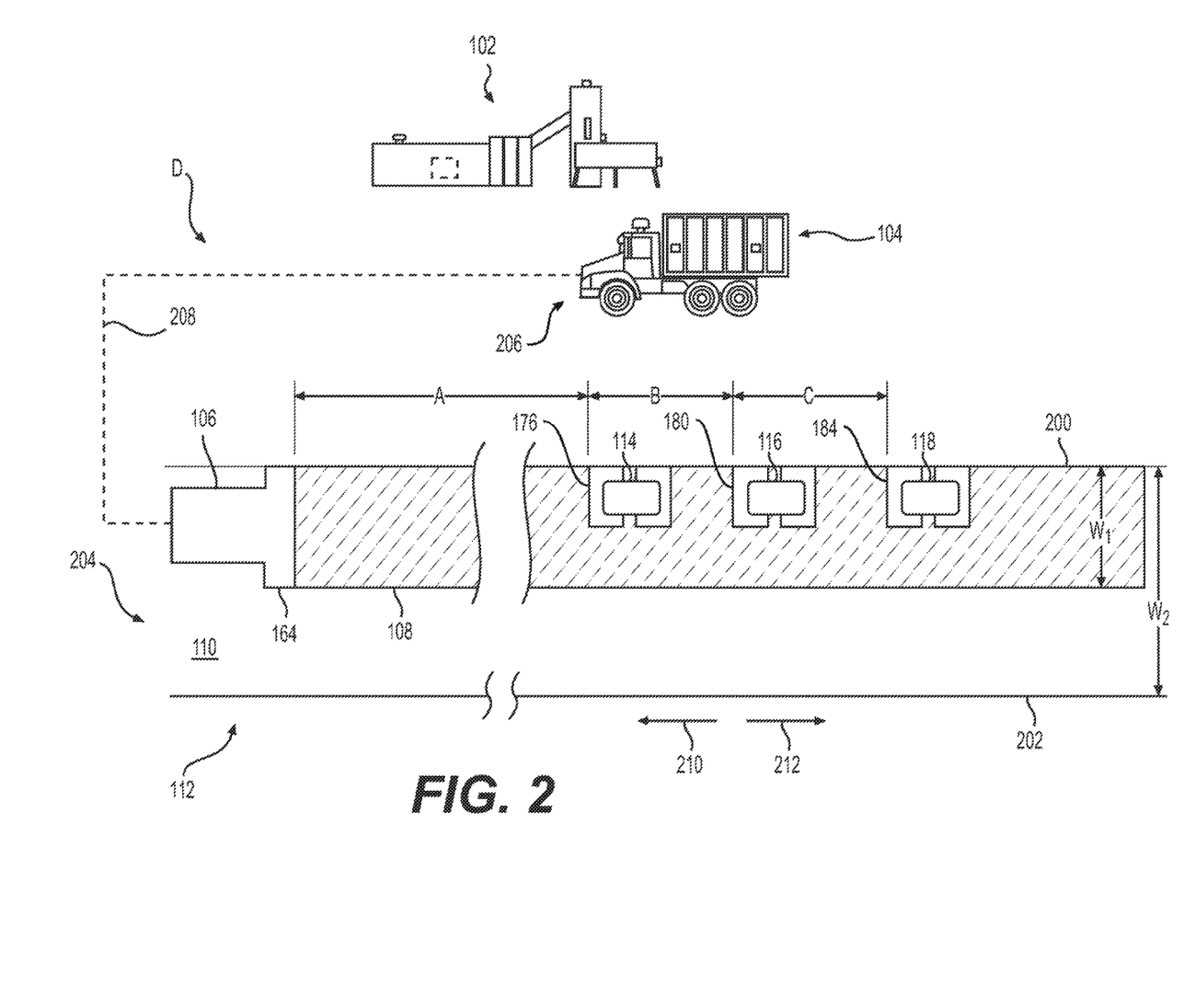
FIG. 2 is a schematic illustration of a worksite at which one or more machines of the paving system shown in FIG. 1 may be utilized.

FIG. 2 is an example schematic diagram illustrating various components of the paving system 100 performing respective paving operations. For example, FIG. 2 illustrates a paving machine 106 depositing paving material 108 onto the work surface 110 of the worksite 112. In particular, FIG. 2 illustrates the paving machine 106 depositing a mat of paving material 108 within a first boundary 200 (e.g., a right-hand side boundary) and a second boundary 202 (e.g., a left-hand side boundary) of a cut area 204 forming the work surface 110. In such examples, the cut area 204 may be formed by one or more cold planers or other excavation machines (not shown) preceding the paving machine 106. The cut area 204 may have any desirable depth (in a direction into the page), and the paving machine 106 may be configured to deposit a mat of paving material 108 having a thickness (in a direction into the page) that is greater than or equal to the depth of the cut area 204. The thickness of the mat of paving material 108 may be controlled by raising or lowering the screed 164 of the paving machine 106 as desired, and in some examples, the thickness of the mat may be greater than the depth of the cut area 204 to account for compaction of the paving material 108 by the compaction machines 114, 116, 118. In some paving applications it may be desirable to maintain the screed 164 at a substantially constant height in order to minimize variations in the mat of paving material mat 108 and maximize the relative smoothness of the mat. The screed 164 may be maintained at such a substantially constant height by, for example, operating the paving machine 106 at a substantially constant speed (e.g., by avoiding relatively rapid accelerations or decelerations). Additionally, it may be desirable to minimize variations in the speed of the paving machine 106 as the paving machine 106 deposits the paving material 108. In such examples, maintaining a substantially constant speed of the paving machine 106 as it travels within the cut area 204 in either the direction of arrow 210 or in the direction of arrow 212 may maximize the consistency, uniformity, and other quality characteristics of the resulting mat of paving material 108.

As noted above, the paving system 100 of the present disclosure may be employed to coordinate the activities of the paving machine 106, one or more haul trucks 104, one or more compaction machines 114, 116, 118, and/or other paving system equipment in order to minimize relatively rapid variations in the speed of the paving machine 106, and to avoid paving machine stoppages, thereby maximizing the quality of the mat of paving material 108. For example, the system controller 122, the truck controller 154, the paving machine controller 172, and/or one or more other controllers of the paving system 100 may be configured to determine a desired (e.g., an optimal) paving machine speed, in substantially real-time, based on the rate of delivery of paving material 108 to the worksite 112, the effective compaction rate of the paving material by the compaction machines 114, 116, 118, and/or other factors. In some examples, the desired paving machine speed determined by, for example, the system controller 122 may comprise a rolling average that is calculated based on information received by the system controller 122.

In some examples, the delivery rate of paving material 108 being delivered from the paving material plant 102 (FIG. 1) to the worksite 112 remote from the paving material plant 102 may be determined based on a distance (e.g., the length of a travel path) between the paving material plant 102 and the worksite 112, a speed of the haul truck 104 carrying the paving material 108, an amount of paving material being carried by the haul truck 104, traffic associated with the travel path, weather conditions associated with the travel path, and/or other information. An example travel path 208 is illustrated in FIG. 2. For instance, the example travel path 208 may extend a distance D from an origination location 206 (e.g., the paving material plant 102) of the haul truck 104 to a destination location (e.g., a portion of the cut area 204, a location of the paving machine 106, and/or any other location at the worksite 112) of the haul truck 104.

In such examples, the system controller 122, the truck controller 154, the paving machine controller 172, and/or one or more other controllers of the paving system 100 may also be configured to determine a plurality of paving machine speeds based on information associated with the paving system 100. For example, the system controller 122 may be configured to determine one or more paving machine speeds based on the delivery rate of the paving material 108. For example, the paving machine 106 may be capable of consuming paving material 108 (e.g., depositing a mat of paving material 108 on the work surface 110) within a range of acceptable consumption rates (e.g., tons/hour) depending on the size, capacity, and other configurations of the paving machine. Such consumption rates may also be determined based on and/or may otherwise depend on the effective width of the screed 164 (e.g., the distance between the end plates of the screed 164), a width $W_1$ of the mat of paving material 108 being deposited on the work surface 110, the thickness of the mat of paving material 108, and/or other parameters. Accordingly, one or more paving machine speeds may be determined by the system controller 122 based on the delivery rate of the paving material 108 and/or on an acceptable consumption rate associated with the particular paving machine 106. For example, one or more such paving machine speeds may comprise a maximum paving machine speed determined based on the maximum acceptable consumption rate of the paving machine 106 as limited by the delivery rate of the paving material 108 (or vice versa).

The system controller 122 may also be configured to determine one or more paving machine speeds based on a maximum compaction rate of at least one of the compaction machines 114, 116, 118 following the paving machine 106 at the worksite 112. For example, as shown in FIG. 2, the breakdown drum 176 of the compaction machine 114 may be spaced from the screed 164 of the paving machine 106 by a distance A, the breakdown drum 176 may also be spaced from the intermediate drum 180 of the compaction machine 116 by a distance B, and the intermediate drum 180 may be spaced from the finish drum 184 by a distance C. Such spacing may vary based on the respective speeds of the compaction machines 114, 116, 118 and of the paving machine 106. For example, a paving plan corresponding to and/or otherwise associated with the worksite 112 may identify the cut area 204 of the work surface 110. In particular, the paving plan may include information (e.g., GPS coordinates or other local/global positioning information) indicating the location, configuration, extent, and/or other configurations of the first boundary 200 and/or of the second boundary 202. The paving plan may also include information indicating the depth of the cut area 204, the width W2 of the cut area 204, a desired thickness of the mat of paving material 108, and the desired stiffness or density of the mat of paving material 108 to be deposited within the cut area 204. Based at least in part on the above information, and/or based on the width $W_1$ of the mat, the width of the drum employed by the particular compaction machine (e.g., the width of the breakdown drum 176, the width of the intermediate drum 180, or the width of the finish drum 184), the desired stiffness or density of the mat of paving material 108 specified by the paving plan, and/or other factors, the system controller 122 may determine a maximum compaction rate of at least one of the compaction machines 114, 116, 118. Such a maximum compaction rate may comprise the maximum rate at which the particular compaction machine may compact the mat of paving material 108 deposited by the paving machine 106 to the desired stiffness or density specified in the paving plan. It is understood that in order to achieve such a desired stiffness or density, the speed of the particular compaction machine may be constrained by a compaction intensity (e.g., impacts per foot) specified in the paving plan. For example, the respective vibration systems associated with the breakdown drum 176 and the intermediate drum 180 may be required to operate within a particular frequency range in order to achieve the desired number of impacts per foot or other compaction requirements specified in the paving plan, and such parameters may limit the speed at which the respective compaction machines 114, 116 may travel when compacting the mat of paving material 108.

In further examples, with the above information, and based on the width $W_1$ of the mat, the corresponding widths of the drums employed by the respective compaction machines 114, 116, 118 (e.g., the width of the breakdown drum 176, the width of the intermediate drum 180, and the width of the finish drum 184), and the number of compaction machines 114, 116, 118 being utilized at the worksite 112, the system controller 122 may also determine a maximum effective compaction rate of the train of compaction machines 114, 116, 118. Such a maximum effective compaction rate may comprise the maximum rate at which the compaction machines 114, 116, 118, working together as a unit, may compact the mat of paving material 108 deposited by the paving machine 106 to the desired stiffness or density specified in the paving plan. It is understood that in order to achieve such a desired stiffness or density, one or more of the compaction machines 114, 116, 118 may be required to traverse the mat of paving material 108 multiple times (e.g., multiple passes), and that in doing so, one or more of the compaction machines 114, 116, 118 may traverse the mat paving material 108 in the direction of arrow 210 and/or in the direction of arrow 212. It is also understood that, as noted above, the speed of individual ones of the compaction machines 114, 116, 118 may be constrained by the compaction intensity specified in the paving plan. For example, the respective vibration systems associated with the breakdown drum 176 and the intermediate drum 180 may be required to operate within a particular frequency range in order to achieve the desired number of impacts per foot or other compaction requirements specified in the paving plan, and such parameters may limit the speed at which the respective compaction machines 114, 116 may travel when compacting the mat of paving material 108. Thus, in some examples, the system controller 122 may determine one or more paving machine speeds based on the maximum effective compaction rate described above. For example, one or more such paving machine speeds may comprise a maximum paving machine speed as limited by the maximum effective compaction rate of the compaction machines 114, 116, 118 (or vice versa).

In some examples, the system controller 122 may also determine one or more paving machine speeds based on a current paving material production rate of the paving material plant 102. On any given day, the paving material plant 102 may produce paving material 108 that is delivered to and used on multiple different worksites 112. In such examples, the hourly output of the paving material plant 102 (e.g., tons of paving material per hour) may be divided among the multiple worksites 112 based on contractual obligations, current and/or expected demand of the worksites 112, and other factors. Thus, in such examples the system controller 122 may determine one or more paving machine speeds based on the current paving material production rate of the paving material plant 102 and corresponding to the worksite 112. One or more such paving machine speeds may comprise a maximum paving machine speed as limited by the portion of the current paving material production rate that is assigned to and/or that is being delivered to the worksite 112. In still further examples, the system controller 122 may determine one or more additional paving machine speeds based on environmental information (e.g., weather conditions at the worksite 112), paving system information (e.g., the quantity of paving machines 106 operating at the worksite 112), and/or other parameters or information.

In any of the examples described herein, the system controller 122 may determine a desired paving machine speed based on a lowest one of the plurality of determined paving machine speeds. In some examples, the desired paving machine speed may comprise the lowest one of the plurality of determined paving machine speeds. In other examples, the desired paving machine speed may comprise an average (e.g., a rolling average) of two or more of the plurality of determined paving machine speeds, a median of the plurality of determined paving machine speeds, a mode of the plurality of determined paving machine speeds, and/or some other speed determined (e.g., calculated, determined using a look-up table, determined using a neural network, etc.) utilizing at least one of the plurality of determined paving machine speeds. The system controller 122 may provide such a desired paving speed to, for example, the paving machine controller 172 for use in operating the paving machine 106. A desired paving machine speed determined in this way may ensure that the mat of paving material 108 is substantially continuously deposited on the work surface 110 without stoppage of the paving machine 106. A desired paving machine speed determined in this way may also be used minimize the rate of acceleration and/or deceleration of the paving machine 106 while the paving material 108 is being deposited. For example, the process described above may be performed substantially continuously by the system controller 122 such that the paving machine 106 may be controlled to travel at an optimized desired paving machine speed that is responsive to changing conditions of the paving system 100. In some examples, however, the paving machine 106 may only be controlled to change speeds (e.g., accelerate or decelerate) when the determined paving machine speed falls above or below a corresponding paving machine speed threshold. In such examples, the rate of acceleration or deceleration may be constrained to an acceptable level (e.g., less than approximately 10 ft/sec$^2$). Constraining the rate of acceleration or deceleration in this way may minimize gaps, thickness changes, and/or other irregularities in the mat of paving material 108 being deposited by the paving machine 106, thereby further improving the quality of the mat of paving material 108.

Figure 3:
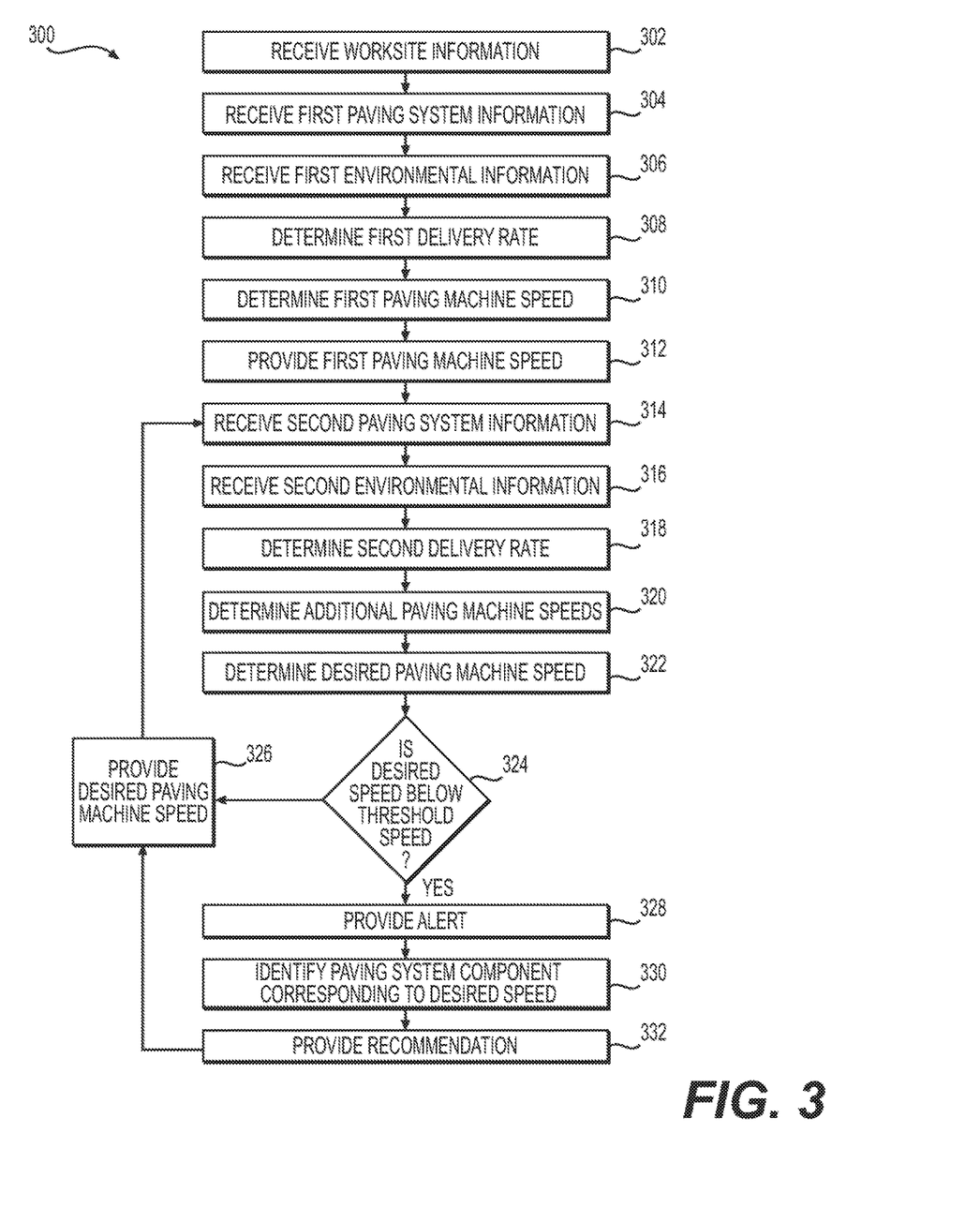
FIG. 3 is a flow chart depicting an example method of controlling the speed of a paving machine associated with the paving system shown in FIG. 1.

FIG. 3 illustrates a flow chart depicting an example method 300 of controlling the operation of a paving system 100. In particular, the flow chart of FIG. 3 illustrates an example method of coordinating the activities of multiple machines associated with the paving system 100 described above in order to maximize the quality of the mat of paving material 108 being deposited on a work surface 110 of a worksite 112. The example method 300 is illustrated as a collection of steps in a logical flow diagram, which represents operations that can be implemented in hardware, software, or a combination thereof. In the context of software, the steps represent computer-executable instructions stored in memory. When such instructions are executed by, for example, the system controller 122, such instructions may cause the system controller 122, various components of the control system 120, the paving material plant controller 144, the truck controller 154, the paving machine controller 172, and/or other components of the paving system 100 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 300 is described with reference to the paving system 100, the control system 120, the paving material plant 102, and/or other items shown in FIGS. 1 and 2. In particular, although any part of and/or the entire method 300 may be performed by the truck controller 154, the paving machine controller 172, the paving material plant controller 144, the electronic device 128, and/or other components of the paving system 100, unless otherwise specified, the method 300 will be described below with respect to the system controller 122 for ease of description.

With reference to FIG. 3, at 302 the system controller 122 may receive worksite information. Such worksite information may include, for example, the paving plan associated with and/or corresponding to the worksite 112. In such examples, the paving plan may include a map of the worksite 112 that includes and/or otherwise identifies the various locations, shapes, sizes, extents, configurations, and/or other parameters of the cut area 204 to be paved by the paving machine 106. In some examples, the worksite 112 may include more than one cut areas 204, and in such examples, the paving plan may include a map that identifies the respective locations, shapes, sizes, extents, configurations, and/or other parameters of the multiple cut areas 204 to be paved. In particular, such a paving plan may include information (e.g., GPS coordinates or other local/global positioning information) indicating the location, configuration, extent, and/or other configurations of the first boundary 200 and/or of the second boundary 202 of a cut area 204. The paving plan may also include information indicating the depth of the cut area 204, the width W2 of the cut area 204, and the desired stiffness and/or density of the mat of paving material 108 to be deposited within the cut area 204. The paving plan may further include the type of paving material 108 (e.g., the composition of the paving material 108) to be deposited within the cut area 204, as well as a required number of compaction machine passes, a desired number of impacts per foot associated with one or more of the compaction machines 114, 116, and/or any other parameters governing the finished mat of paving material 108 to be produced by the paving system 100. In such examples, at 302 the system controller 122 may receive the worksite information, in electronic form, from a foreman at the worksite 112, from an operator or other employee of the paving material plant 102, or from any other source. For example, at 302 a foreman or other operator of the paving system 100 may manually or electronically enter the paving plan or other such worksite information using a keyboard, touch screen, or other operator interface of the system controller 122 and/or of the electronic device 128. It is understood that the paving plan and/or other worksite information received at 302 may be applicable for a predetermined time period (e.g., an eight-hour shift, a one-hour shift, etc.).

At 304, the system controller 122 may receive first paving system information. Such first paving system information may include, for example, the quantity of haul trucks 104 assigned to the worksite 112, the size and/or capacity of the respective haul trucks 104, the quantity and type of compaction machines 114, 116, 118 assigned to the worksite 112, the quantity of paving machines 106 assigned to the worksite 112, the expected paving material production rate of the paving material plant 102 and corresponding to the worksite 112, the distance D of the travel path 208 extending from the paving material plant 102 to the worksite 112, the expected elapsed time it will take a haul truck 104 to travel along the travel path 208 from the paving material plant 102 to the worksite 112, and/or other like information. In some examples, the first paving system information received at 304 may also include the maximum effective compaction rate of the fleet of compaction machines 114, 116, 118 assigned to the worksite 112, and/or the maximum throughput of the paving machine 106. Similar to the worksite information described above with respect to 302, at 304 the system controller 122 may receive the first paving system information, in electronic form, from a foreman at the worksite 112, from an operator or other employee of the paving material plant 102, or from any other source. For example, at 304 a foreman or other operator of the paving system 100 may manually or electronically enter the first paving system information using a keyboard, touch screen, or other operator interface of the system controller 122 and/or of the electronic device 128.

At 306, the system controller 122 may receive first environmental information. For example, such first environmental information may include forecasted weather conditions, actual current weather conditions, and/or other expected or current weather information associated with the travel path 208 extending from the paving material plant 102 to the worksite 112. In such examples, the weather information may include the presence of rain, snow, ice, high winds, hail, or other weather conditions that may hinder the progress (e.g., reduce the travel speed) of one or more haul trucks 104 at various locations along the travel path 208. Such first environmental information may also include expected or actual traffic information associated with the travel path 208. In such examples, traffic information may indicate construction, accidents, congestion, and/or other factors that may hinder the progress of one or more haul trucks 104 at various locations along the travel path 208.

At 308, the system controller 122 may determine a first delivery rate of paving material 108 to be delivered from the paving material plant 102 to the worksite 112. In such examples, the first delivery rate determined at 308 may be an expected, predicted, or initial delivery rate of the paving material 108 that is calculated and/or otherwise determined based at least partly on the worksite information received at 302, the first paving system information received at 304, and/or the first environmental information received at 306. For example, based on the number of haul trucks 104 assigned to the worksite 112, the capacity of each respective haul truck 104, and the expected paving material production rate of the paving material plant 102, the system controller 122 may determine the amount of paving material 108 (e.g., tons) capable of being delivered to the worksite 112 from the paving material plant 102. Further, based on the distance D of the travel path 208, the speed limits associated with the various portions of the travel path 208, the weather information associated with the travel path 208, and/or the traffic information associated with the travel path 208, the system controller 122 may determine the first delivery rate (e.g., tons/hour) noted above. In some examples, the system controller 122 may utilize one or more look-up tables, neural networks, speed determination algorithms, or other software or hardware components to determine the first delivery rate at 308. For example, at 308 the system controller 122 may access empirical data or historical data indicative of previous delivery rates corresponding to the travel path 208, and may estimate the first delivery rate at 308 based on such data. In such examples, the system controller 122 may generate one or more scaling factors (e.g., a speed deduction due to weather conditions, traffic, or other information) based on the first environmental information received at 306, and/or based on information received at 302 and/or at 304. The system controller 122 may modify the first delivery rate determined at 308 based at least in part on such one or more scaling factors. In further examples, at 308 the system controller 122 may use the algorithm: Distance=(Rate)*(Time) to calculate the first delivery rate. In such examples, the values entered into such an algorithm may be estimated by the system controller 122, may be derived using historical and/or empirical data, and/or may be received by the system controller 122 from one or more location sensors described herein, from the GPS satellite 132, and/or from other sources. It is also understood that algorithms or other components used to determine the first delivery rate may include one or more weight factors, scaling factors, terms, constants, or other variables or terms to account for or represent the information received by the system controller 122 at 302, at 304, and/or at 306.

At 310, the system controller 122 may determine a first paving machine speed, and the first paving machine speed may be determined based on the first delivery rate determined at 308. For example, the first paving machine speed determined at 310 may be an optimal predicted speed of the paving machine 106 based on the initial and/or predicted first delivery rate of paving material 108. For example, and merely for purposes of discussion, if the system controller 122 determines a first (e.g., estimated) delivery rate of paving material 108 at 308 to be approximately 40 tons/hour, the system controller 122 may determine a corresponding first paving machine speed at 310 based on an acceptable range of paving material consumption rates of the paving machine 106, the width $W_1$ of the mat of paving material 108 to be deposited on the work surface 110, the desired thickness of the mat, and/or other information received at 302-306. For example, at 310 the system controller 122 may determine whether the first delivery rate of paving material (tons/hour) determined at 308 is greater than or equal to a maximum desired paving material consumption rate (tons/hour) of the paving machine 106. If so, the system controller 122 may select, calculate, and/or otherwise determine a first paving machine speed at 310 that is suitable to accommodate the first delivery rate of paving material 108 determined at 308. In such examples, the system controller 122 may determine the first paving machine speed at 308 using one or more look-up tables, neural networks, speed determination algorithms, or other software or hardware components. For example, at 310 the system controller 122 may access empirical data or historical data indicative of previous paving machine speeds corresponding to the worksite 112, empirical or historical data indicative of previous paving machine speeds traveled by the particular paving machine 106, and/or empirical or historical data indicative of previous paving machine speeds corresponding to the value of the first delivery rate determined at 308. In such examples, the system controller 122 may estimate and/or calculate the first paving machine speed at 310 based on such data. In any such examples, at 310 the system controller 122 may use the algorithm: Distance=(Rate)*(Time) to calculate the first paving machine speed. It is also understood that algorithms or other components used to determine the first paving machine speed at 312 may include one or more weight factors, scaling factors, terms, constants, or other variables or terms to account for or represent the information received by the system controller 122 at 302, at 304, and/or at 306. For example, such information may include the number and/or type of compaction machines 114, 116, 118 following the paving machine 106 at the worksite 112. Such information may also include the depth, length, width W2, and/or other configurations of the cut area 204.

In some examples, the first paving machine speed determined at 310 may be limited and/or constrained by the maximum effective compaction rate of the fleet of compaction machines 114, 116, 118 following the paving machine 106 at the worksite 112. In such examples, at 310 the system controller 122 may compare the determined first paving machine speed to the maximum effective compaction rate of the fleet of compaction machines 114, 116, 118 received at 304. For example, if the maximum effective compaction rate of the compaction machines 114, 116, 118 is greater than or equal to the first paving machine speed determined at 310, the system controller 122 may provide the first paving machine speed to the machine controller 172 at 312. Alternatively, if the maximum effective compaction rate of the compaction machines 114, 116, 118 is less than the first paving machine speed determined at 310, the system controller 122 may modify the first paving machine speed to equal the maximum effective compaction rate of the compaction machines 114, 116, 118. The system controller 122 may then provide the modified first paving machine speed (e.g., the maximum effective compaction rate) to the paving machine controller 172 at 312. It is understood that in some examples, on the other hand, the comparison between the first paving machine speed and the maximum effective compaction rate described above may be omitted. In such examples, the system controller 122 may provide the first paving machine speed to the paving machine controller 172 at 312 without performing such a comparison. In any of the examples described herein, at 312 the paving machine controller 172 may cause the paving machine 106 to travel at the first paving machine speed while depositing paving material 108 on the works surface 110 of the worksite 112. For example, causing the paving machine 106 to travel at the first paving machine speed while depositing paving material 108 on the works surface 110 may comprise operating the paving machine 106 in an autonomous mode of operation or in a semi-autonomous mode of operation in which the paving machine controller 172 controls at least one of the speed, acceleration, deceleration of the paving machine 106. In such autonomous or semi-autonomous modes of operation, the paving machine controller 172 may also control, at least in part, steering of the paving machine 106 using GPS coordinates and/or other location information defining the location and/or extent of the first boundary 200 and/or the second boundary 202. In still further examples, at 312 the paving machine controller 172 may cause the paving machine 106 to travel at the first paving machine speed while depositing paving material 108 on the works surface 110 and while operating the paving machine 206 in a manual mode of operation. In such examples, the paving machine controller 172 may cause the paving machine 106 to maintain the first paving machine speed (e.g., may operate the paving machine 106 in "cruise control").

At 314, the system controller 122 may receive second paving system information. As noted above, the first paving system information received at 304 may comprise estimated and/or expected information associated with the one or more haul trucks 104, paving machines 106, and/or compaction machines 114, 116, 118 of the paving system 100. The second paving system information received at 314, on the other hand, may comprise actual, real-time, sensed, and/or measured information associated with the one or more haul trucks 104, paving machines 106, and/or compaction machines 114, 116, 118 of the paving system 100. For example, the second paving system information received at 314 may include, among other things, the actual quantity of haul trucks 104 currently servicing the worksite 112, the size and/or capacity of the respective haul trucks 104, the actual quantity and type of compaction machines 114, 116, 118 currently servicing the worksite 112, the actual quantity of paving machines 106 currently servicing the worksite 112, the current paving material production rate of the paving material plant 102 and corresponding to the worksite 112, the elapsed time indicative of a haul truck 104 traveling (e.g., the actual amount of time it took a particular haul truck 104 to travel) along the travel path 208 from the paving material plant 102 to the worksite 112, the amount (e.g., tons) of paving material 108 carried by the haul truck 108, and/or other like information. In some examples, the second paving system information received at 314 may also include the maximum effective compaction rate of the fleet of compaction machines 114, 116, 118 that is currently servicing the worksite 112, and/or the actual maximum throughput of the paving machine 106 currently servicing the worksite 112. The second paving system information received at 314 may further include GPS coordinates and/or other information indicating the current location of the respective one or more haul trucks 104, the paving machine 106, and/or the compaction machines 114, 116, 118. Such location information may be determined by one or more of the location sensors 130 described above. In some examples, such location information may also include a corresponding timestamp indicating a time (e.g., day, month, year, hour, minute, second, millisecond, etc.) at which the location information was determined. Similar to the first paving system information received at 304, at 314 the system controller 122 may receive the second paving system information in electronic form, from a foreman at the worksite 112, from an operator or other employee of the paving material plant 102, from one or more of the location sensors 130, from one or more of the communication devices 126, and/or from any other source. In some examples, at 314 the system controller 122 may receive a signal from a location sensor 130 mounted on a haul truck 104 and/or otherwise configured to determine the location of the haul truck 104. In such examples, the signal may include GPS coordinates and/or other information indicating the location of the haul truck 104 as determined by the location sensor 130.

At 316, the system controller 122 may receive second environmental information. For example, such second environmental information may include current weather conditions and/or other current weather information associated with the travel path 208. In such examples, weather information may include the current presence of rain, snow, ice, high winds, hail, or other weather conditions that may be hindering the progress (e.g., reducing the travel speed) of one or more haul trucks 104 at various locations along the travel path 208. Such first environmental information may also include current traffic information associated with the travel path 208. In such examples, the current traffic information may indicate construction, accidents, congestion, and/or other factors that may be hindering the progress of one or more haul trucks 104 at various locations along the travel path 208.

At 318, the system controller 122 may determine a second delivery rate of paving material 108 being delivered from the paving material plant 102 to the worksite 112 remote from the paving material plant 102. In such examples, the second delivery rate determined at 314 may be an actual or current delivery rate of the paving material 108 that is calculated and/or otherwise determined, in substantially real-time, based at least partly on the second paving system information received at 314 and/or the second environmental information received at 316. For example, based on the number of haul trucks 104 currently servicing the worksite 112, the capacity of each respective haul truck 104, and the current paving material production rate of the paving material plant 102 and corresponding to the worksite 112, the system controller 122 may determine the amount of paving material 108 (e.g., tons) currently being delivered to the worksite 112 from the paving material plant 102. Further, based on the actual elapsed time indicative of a haul truck 104 traveling along the travel path 208, and the amount of paving material 108 being carried by the haul truck 104, the system controller 122 may determine the second delivery rate (e.g., tons/hour) noted above. In some examples, at 318 the system controller 122 may determine, based on a signal received from one or more of the location sensors 130, a second delivery rate of paving material 108 being delivered from the paving material plant 102 to the worksite 112 by at least one of the haul trucks 104. Additionally, it is understood that the system controller 122 may perform one or more steps of the method 300 multiple times (e.g., continuously, substantially continuously, at one or more time intervals, etc.) during the course of a paving operation. In such examples, the system controller 122 may determine a plurality of consecutive second delivery rates by repeating step 318 multiple times. In some examples, the system controller 122 may determine the plurality of consecutive delivery rates by calculating an average (e.g., a rolling average) of at least two such delivery rates. For instance, in some examples, the system controller 122 may determine a second delivery rate at 318 by averaging a current (e.g., an actual) delivery rate of a particular haul truck 104 with one or more second delivery rates previously determined at 318. In any of the examples described herein, the system controller 122 may generate, calculate, select, and/or otherwise determine the second delivery rate at 318 utilizing one or more of the look-up tables, neural networks, algorithms, empirical data, historical data, and/or other components or processes described above with respect to at least step 308.

At 320, the system controller 122 may determine a plurality of additional paving machine speeds. In some examples, at least one paving machine speed of the plurality of paving machine speeds determined at 320 may be determined based on the second delivery rate determined at 318. For example, as noted above, the paving machine 106 may be capable of consuming paving material 108 (e.g., depositing a mat of paving material 108 on the work surface 110) within a range of acceptable paving material consumption rates (e.g., tons/hour) depending on the size of the paving machine 106, the capacity of the paving machine 106, the effective width of the screed 164, the width $W_1$ of the mat of paving material 108, the thickness of the mat of paving material 108, and/or other parameters. Accordingly, at least one paving machine speed of the plurality of paving machine speeds determined at 320 may be determined based on the second delivery rate of the paving material 108 and on an acceptable paving material consumption rate associated with the particular paving machine 106. For example, at least one paving machine speed of the plurality of paving machine speeds determined at 320 may comprise a maximum paving machine speed determined based on the maximum acceptable paving material consumption rate of the particular paving machine 106 as limited by the second (e.g., actual) delivery rate of the paving material 108 (or vice versa).

At 320, the system controller 122 may also determine at least one paving machine speed of the plurality of paving machine speeds based on the maximum effective compaction rate of at least one of the compaction machines 114, 116, 118 currently following the paving machine 106 at the worksite 112. In such examples, the paving plan received at 302 may include information indicating the depth of the cut area 204, the width W2 of the cut area 204, and the desired density of the mat of paving material 108 to be deposited within the cut area 204. With this information, and based on the width $W_1$ of the mat, the corresponding widths of the drums employed by the respective compaction machines 114, 116, 118 (e.g., the width of the breakdown drum 176, the width of the intermediate drum 180, and the width of the finish drum 184), and the number of compaction machines 114, 116, 118 currently being utilized at the worksite 112, the system controller 122 may determine a maximum effective compaction rate of the train of compaction machines 114, 116, 118. It is also understood that the speed of individual ones of the compaction machines 114, 116, 118 may be constrained by a compaction intensity (e.g., impacts per foot) specified in the paving plan. For example, the respective vibration systems associated with the breakdown drum 176 and the intermediate drum 180 may be required to operate within a particular frequency range in order to achieve the desired number of impacts per foot specified in the paving plan, and such parameters may limit the speed at which the compaction machines 114, 116 may travel when compacting the mat of paving material 108. Thus, at 320 the system controller 122 may determine at least one paving machine speed of the plurality of paving machine speeds based on the maximum effective compaction rate described above, and the at least one paving machine speed may be limited by the maximum effective compaction rate of the compaction machines 114, 116, 118.

At 320, the system controller 122 may also determine at least one paving machine speed of the plurality of paving machine speeds based on a current paving material production rate of the paving material plant 102. In particular, the system controller 122 may determine at least one paving machine speed based on the current paving material production rate of the paving material plant 102 and corresponding to the worksite 112. Such a paving machine speed may comprise a maximum paving machine speed as limited by the portion of the current paving material production rate that corresponds to and/or that is actually being delivered to the worksite 112. In still further examples, at 320 the system controller 122 may determine one or more additional paving machine speeds based at least partly on the second paving system information received at 314, the second environmental information received at 316, and/or other parameters or information.

In any of the examples described herein, the system controller 122 may generate, calculate, select, and/or otherwise determine one or more of the additional paving machine speeds at 320 utilizing one or more of the look-up tables, neural networks, algorithms, empirical data, historical data, and/or other components or processes described above with respect to at least step 310.

At 322, the system controller 122 may determine a desired paving machine speed based on a lowest speed of the plurality paving machine speeds determined at 320. For example, at 322 the system controller 122 may identify and/or select the lowest paving machine speed determined at 320, and the paving machine speed selected at 322 may comprise the desired paving machine speed. In such examples, selecting the lowest paving machine speed of the plurality of determined paving machine speeds may ensure that the paving machine 106 does not operate at a speed that will result in stoppage of the paving machine 106 while the paving machine 106 is depositing the mat of paving material 108 on the work surface 110. For example, by selecting the lowest paving machine speed of the plurality of determined paving machine speeds the system controller 122 may ensure that the paving machine 106 will not run out of paving material 108 due to slow paving material delivery rates associated with the haul trucks 104. By selecting the lowest paving machine speed of the plurality of determined paving machine speeds the system controller 122 may also ensure that the paving machine 106 will not travel faster than the maximum effective compaction rate of the one or more compaction machines 114, 116, 118 following the paving machine 106 at the worksite 112. Accordingly, determining the desired paving machine speed in this way may improve the consistency and quality of the mat of paving material by minimizing and/or eliminating stoppage of the paving machine 106 while the paving material 108 is being deposited on the work surface 110.

At 324, the system controller 122 may compare the desired paving machine speed determined at 322 to a predetermined threshold speed. In such examples, the threshold speed may be a minimum operating speed of the paving machine, and such a minimum operating speed of the paving machine 106 may be equal to approximately 15 ft/minute. In other examples, however, different minimum operating speeds and/or different threshold speeds may be employed by the system controller 122 for comparison at 324. It is also understood that in further examples, the system controller 122 may compare the desired paving machine speed to a maximum operating speed of the paving machine 106, and/or to one or more threshold speed ranges at 324. With continued reference to FIG. 3, in examples in which the system controller 122 determines that the desired paving machine speed is greater than or equal to the threshold speed (324—No), the system controller 122 may, at 326, provide the desired paving machine speed to the paving machine controller 172. In response, the paving machine controller 172 may cause the paving machine 106 to travel at the desired paving machine speed based on the system controller 122 determining that the desired paving machine speed is greater than or equal to the threshold speed. In such examples, the paving machine controller 172 may control the paving machine 106 to operate in manual mode (e.g., "cruise control"), autonomous mode, and/or semi-autonomous mode as described above with respect to step 312. Alternatively, in embodiments in which step 322, 324, and/or other steps of the method 300 are performed by the paving machine controller 172, step 326 may be omitted.

In examples in which the system controller 122 determines that the desired paving machine speed is less than the threshold speed (324—Yes), the system controller 122 may, at 328, provide a visible, audible, tactile, and/or other alert to an operator of the paving machine 106 via, for example, the display 168 and/or via one or more components connected to the paving machine control system 170. Such an alert may include information indicating the desired paving machine speed, as well as information indicating the expected time until paving machine stoppage may occur. In some examples, at 328 the system controller 122 may additionally or alternatively provide the alert to a foreman at the worksite 112 via the electronic device 128, to one or more employees of the paving material plant 102 via one or more components connected to the paving material plant controller 144, to one or more haul truck operators via one or more haul truck components connected to the truck controller 154, to one or more compaction machine operators via one or more compaction machine components, and/or to other workers associated with the worksite 112.

At 330, and based at least in part on determining that the desired paving machine speed is less than the threshold speed (324—Yes), the system controller 122 may identify a machine of the paving system 100 corresponding to the lowest speed of the plurality of paving machine speeds determined at 320. For example, at 330 the system controller 122 may identify the haul truck 104, compaction machine 114, 116, 118, and/or other paving system machine that is the limiting factor resulting in the desired paving machine speed.

At 332, the system controller 122 may provide one or more recommendations associated with the machine identified at 330 and/or associated with the lowest speed of the plurality of paving machine speeds determined at 320. For example, if the system controller 122 determines at 330 that the lowest speed of the plurality of paving machine speeds was determined based on a particular maximum compaction rate of the one or more compaction machines 114, 116, 118 following the paving machine 106, the system controller 122 may, at 332, provide a recommendation indicating the particular maximum compaction rate (e.g., the limiting compaction rate), the resulting lowest speed of the plurality of paving machine speeds (e.g., the desired paving machine speed), and a proposed course of action that would increase the desired paving machine speed. Such a proposed course of action may include, among other things, the proposed addition of one or more compaction machines 114, 116, 118. Such a proposed course of action, if implemented, may result in an increase in the desired paving machine speed, thereby increasing the efficiency and/or output of the paving system 100. In additional examples, if the system controller 122 determines at 330 that the lowest speed of the plurality of paving machine speeds was determined based on the maximum effective compaction rate of the one or more compaction machines 114, 116, 118 following the paving machine 106, the system controller 122 may, at 332, provide a recommendation indicating the maximum effective compaction rate, the resulting lowest speed of the plurality of paving machine speeds (e.g., the desired paving machine speed), and a proposed course of action that would increase the desired paving machine speed. In such examples, such a proposed course of action may include, among other things, the proposed addition of one or more compaction machines 114, 116, 118 in order to increase the maximum effective compaction rate.

In further examples, if the system controller 122 determines at 330 that the lowest speed of the plurality of paving machine speeds was determined based on the delivery rate of paving material 108 being delivered from the paving material plant 102 to the worksite 112 by one or more haul trucks 104, the system controller 122 may, at 332, provide a recommendation indicating the delivery rate of the paving material 108, the resulting lowest speed of the plurality of paving machine speeds (e.g., the desired paving machine speed), and a proposed course of action that would increase the maximum compaction rate. Such a proposed course of action may include, among other things, the proposed addition of one or more haul trucks 104. Such a proposed course of action, if implemented, may result in an increase in the desired paving machine speed, thereby increasing the efficiency and/or output of the paving system 100.

In still further examples, if the system controller 122 determines at 330 that the lowest speed of the plurality of paving machine speeds was determined based on the delivery rate of paving material 108 being delivered from the paving material plant 102 to the worksite 112 by one or more haul trucks 104, the system controller 122 may also determine at 330 whether the amount of paving material 108 currently available to the paving machine 106 (e.g., the amount of paving 108 currently disposed in the hopper 166 of the paving machine 106) is sufficient to maintain continuous operation of the paving machine 106 until the next haul truck 104 arrives at the worksite 112. For example, the system controller 122 may receive one or more signals from a load sensor disposed on the paving machine 106 indicative of an amount of paving material 108 disposed in the hopper 166. At 330, the system controller 122 may compare information included in the one or more signals to a current paving material consumption rate of the paving machine 106 (e.g., tons of paving material per hour being distributed by the paving machine 106) corresponding to the desired paving machine speed at which the paving machine 106 is currently traveling. Based on such a comparison, the system controller 122 may determine that the paving machine 106 may distribute all of the paving material 108 disposed in the hopper 166 on the work surface 110 before the next haul truck 104 is scheduled to arrive at the worksite 112. Based at least in part on such a determination, the system controller 122 may, at 332, provide a recommendation indicating that the paving machine 106 should stop (e.g., should cease the distribution of paving material 108). Alternatively, based at least in part on such a determination, the system controller 122 may, at 332, provide a recommendation indicating that the paving machine 106 should travel at a reduced paving machine speed. It is understood that in order to maintain a sufficiently smooth mat of paving material 108, the rate of deceleration of the paving machine 106 may be limited to a desired level. The system controller 122 may calculate and/or otherwise determine such a reduced paving machine speed at 330 based at least in part on the amount of paving material in the hopper 166, the current paving material consumption rate of the paving machine 106, and/or the second delivery rate determined at 318. In such examples, the system controller 122 may provide the reduced paving machine speed to the paving machine controller 172 at 326.

In any of the examples described herein, the system controller 122 may, at 332, provide a recommendation to an operator of the paving machine 106 via, for example, the display 168 and/or via one or more components connected to the paving machine control system 170. In some examples, at 332 the system controller 122 may additionally or alternatively provide the recommendation to a foreman at the worksite 112 via the electronic device 128, to one or more employees of the paving material plant 102 via one or more components connected to the paving material plant controller 144, and/or to other workers associated with the worksite 112.

As shown in FIG. 3, and as noted above, at 326 the system controller 122 may provide the desired paving machine speed to the paving machine controller 172. In response, the paving machine controller 172 may cause the paving machine 106 to travel at the desired paving machine speed. Alternatively, in embodiments in which step 322, 324, 328, 330, 332, and/or other steps of the method 300 are performed by the paving machine controller 172, step 326 may be omitted. Further, in embodiments in which the system controller 122 provides, at 332, a recommendation indicating that the paving machine 106 should stop, step 326 may be omitted. In any of the embodiments described herein, steps 314-332 may be repeated in a continuous loop for the duration of an operation cycle of the paving machine 106 in order to optimize the speed of the paving machine 106 as the mat of paving material 108 is deposited on the work surface 110. For example, one or more of the desired paving machine speeds determined at 322 may comprise an average speed that is calculated by the system controller 122 using two or more of the paving machine speeds described herein (e.g., the first paving machine speed determined at 310 and one or more of the desired paving machine speeds determined at 322). In such examples, determining a desired paving machine speed at 322 may include determining an average speed. In such examples, the system controller 122 may provide the average speed to the paving machine controller 172, via the network 124.

INDUSTRIAL APPLICABILITY

The present disclosure provides systems and methods for optimizing the speed of a paving machine 106, in substantially real-time, while the paving machine 106 deposits paving material on a work surface 110 of a worksite 112. Such systems and methods may be used to more efficiently coordinate activities of one or more haul trucks 104, paving machines 106, compaction machines 114, 116, 118, and/or other machines or equipment of a paving system 100 during paving operations. For example, such systems and methods may enable a system controller 122 of a control system 120 to determine a desired (e.g., an optimized) paving machine speed based on information associated with the paving material production rate of a paving material plant 102, the delivery rate of paving material 108 being delivered to the worksite 112, a maximum effective compaction rate of one or more compaction machines 114, 116, 118 following the paving machine 106 at the worksite 112, and/or other factors. The system controller 122 may provide such a desired paving machine speed to a paving machine controller 172, and the paving machine controller 172 may cause the paving machine 106 to travel at the desired paving machine speed while depositing the paving material 108 on the work surface 110. Operating the paving machine 106 in this way may maximize efficiency at a paving worksite 112. Additionally, operating the paving machine 106 in accordance with the desired paving machine speed may minimize and/or substantially eliminate paving machine stoppages during the paving process, thereby improving the consistency and quality of the resulting mat of paving material 108.

As noted above with respect to FIGS. 1-3, an example method 300 of operating a paving machine 106 at a worksite 112 may include receiving a variety of information related to the paving system 100 and/or the paving operation that is to be performed at the worksite 112. For example, such a method 300 may include receiving, with the system controller 122, worksite information that includes a paving plan. Such a paving plan may identify the depth of the cut area 204, the location and/or extent of the first boundary 200, the location and/or extent of the second boundary 202, the desired density of the mat of paving material 108 that is to be deposited on the work surface 110, and/or other parameters. The method 300 may also include receiving, with the system controller 122, first paving system information that includes, among other things, at least one of a quantity of haul trucks 104 assigned to the worksite 112, a quantity of compaction machines 114, 116, 118 assigned to the worksite 112, and an expected paving material production rate of the paving material plant 102 and corresponding to the worksite 112. The method 300 may also include receiving, with the system controller 122, first environmental information associated with a travel path 208 extending from the paving material plant 102 to the worksite 112. Based on some or all of this information, the system controller 122 may determine a first (e.g., an initial) delivery rate of paving material 108 to be delivered from the paving material plant 102 to the worksite 112. The system controller 122 may also determine a first (e.g., an initial) paving machine speed based on the paving plan and the first delivery rate of paving material 108. In such examples, the system controller 122 may provide the first paving machine speed to the paving machine controller 172, and the paving machine controller 172 may cause the paving machine 106 to travel at the first paving machine speed while depositing the paving material 108 within the cut area 204.

The method 300 may also include determining one or more additional paving machine speeds, in substantially real-time, and in response to changing paving system information, environmental information, and/or other factors. In this way, the operation of the various machines of the paving system 100 may be coordinated based on a dynamic and often unpredictable paving environment. For example, the method 300 may further include receiving, with the system controller 122, second paving system information and/or second environmental information. Such second paving system information may include an actual elapsed time indicative of a haul truck 104 traveling along the travel path 208 to the worksite 112, an actual amount of paving material carried by the haul truck 104, a current paving material production rate of the paving material plant 102 and corresponding to the worksite 112, and/or other current information. Similarly, such second environmental information may include current weather and/or traffic information associated with the travel path 208. In such examples, the method 300 may also include determining, with the system controller 122, a second delivery rate of paving material 108 being delivered from the paving material plant 102. In such examples, the system controller 122 may also determine a plurality of additional paving machine speeds based on information included in the second paving system information and/or based on information included in the received second environmental information. The system controller 122 may also determine a desired paving machine speed based on a lowest speed of the plurality of additional paving machine speeds. By operating the paving machine 106 at the desired paving machine speed while depositing paving material 108 on the work surface 110, the paving system 100 may minimize and/or substantially eliminate paving machine stoppages during the paving process. As a result, the consistency and/or quality of the mat of paving material 108 may be maximized.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
   determining, with a controller, a delivery rate of paving material being delivered from a paving material plant to a worksite remote from the paving material plant;
   determining, with the controller, a plurality of paving machine speeds, wherein at least one speed of the plurality of paving machine speeds is determined based on the delivery rate;
   determining, with the controller, a desired paving machine speed based on a lowest speed of the plurality of paving machine speeds; and
   causing a paving machine, disposed at the worksite, to travel at the desired paving machine speed while depositing paving material on a work surface of the worksite.

2. The method of claim 1, further comprising providing, with the controller and via a network, the desired paving machine speed to a controller of the paving machine, the controller of the paving machine causing the paving machine to travel at the desired paving speed.

3. The method of claim 1, further comprising:
   determining, with the controller, that the desired paving machine speed is greater than or equal to a threshold speed; and
   causing the paving machine to travel at the desired paving machine speed based on determining that the desired paving machine speed is greater than or equal to the threshold speed.

4. The method of claim 1, further comprising:
   determining, with the controller, that the desired paving machine speed is less than a threshold speed;
   identifying a machine corresponding to the lowest speed of the plurality of paving machine speeds based on determining that the desired paving machine speed is less than the threshold speed; and
   providing, with the controller, a recommendation associated with the machine and the lowest speed.

5. The method of claim 1, further comprising:
   receiving paving system information including an elapsed time indicative of a haul truck traveling along a travel path extending from the paving material plant to the worksite, and an amount of paving material carried by the haul truck; and
   determining the delivery rate based on the paving system information.

6. The method of claim 5, wherein the paving system information further includes a current paving material production rate of the paving material plant and corresponding to the worksite, wherein the at least one speed of the plurality of paving machine speeds is determined based on the current paving material production rate.

7. The method of claim 5, wherein the paving system information further includes a maximum compaction rate of a compaction machine following the paving machine at the worksite, wherein the at least one speed of the plurality of paving machine speeds is determined based on the maximum compaction rate.

8. The method of claim 5, further comprising:
   receiving environmental information including at least one of weather information associated with the travel path, and traffic information associated with the travel path; and
   determining the delivery rate based on the environmental information.

9. The method of claim 1, further comprising:
   receiving paving system information including at least one of a quantity of haul trucks assigned to the worksite, a quantity of compaction machines assigned to the worksite, and an expected paving material production rate of the paving material plant and corresponding to the worksite;
   receiving environmental information including at least one of weather information associated with a travel path extending from the paving material plant to the worksite, and traffic information associated with the travel path; and
   determining, with the controller, an initial delivery rate of paving material to be delivered from the paving material plant, wherein the initial delivery rate comprises an expected delivery rate determined based on the paving system information and the environmental information.

10. The method of claim 9, further comprising:
    receiving a paving plan associated with the worksite, the paving plan identifying a cut area of the work surface;
    determining, with the controller, an initial paving machine speed based on the paving plan and the initial delivery rate; and
    causing the paving machine to travel at the initial paving machine speed while depositing paving material within the cut area.

11. A paving system, comprising:
    a haul truck configured to transport paving material from a paving material plant to a worksite;
    a location sensor configured to determine a location of the haul truck;

a paving machine disposed at the worksite and configured to receive paving material from the haul truck;
a compaction machine following the paving machine at the worksite; and
a system controller in communication with the location sensor via a network, the system controller being configured to:
receive a signal from the location sensor, the signal including information indicating a location of the haul truck determined by the location sensor,
determine, based on the signal, a delivery rate of paving material being delivered from the paving material plant to the worksite by the haul truck,
determine a plurality of paving machine speeds, wherein a first speed of the plurality of paving machine speeds is determined based on the delivery rate, a second speed of the plurality of paving machine speeds is determined based on a maximum compaction rate of the compaction machine, and a third speed of the plurality of paving machine speeds is determined based on a current paving material production rate of the paving material plant and corresponding to the worksite,
determine a desired paving machine speed based on a lowest speed of the plurality of paving machine speeds, and
provide the desired paving machine speed to a paving machine controller via the network, the paving machine controller being configured to cause the paving machine to travel at the desired paving machine speed while depositing paving material on a work surface of the worksite.

12. The paving system of claim 11, wherein the compaction machine comprises a first machine of a plurality of compaction machines following the paving machine at the worksite, and wherein the maximum compaction rate comprises a maximum effective compaction rate of the plurality of compaction machines compacting the paving material to a target density.

13. The paving system of claim 11, wherein the system controller is further configured to:
receive environmental information including at least one of weather information associated with a travel path along which the haul truck travels from the paving material plant to the worksite, and traffic information associated with the travel path, and
determine the delivery rate based on the environmental information.

14. The paving system of claim 11, wherein the system controller is further configured to:
determine that the desired paving machine speed is less than a threshold speed,
identify a machine of the paving system corresponding to the lowest speed of the plurality of paving machine speeds based on determining that the desired paving machine speed is less than the threshold speed, and
provide a recommendation associated with the machine and the lowest speed.

15. The paving system of claim 11, wherein the system controller is further configured to:
receive paving system information including at least one of a quantity of haul trucks assigned to the worksite, a quantity of compaction machines assigned to the worksite, and an expected paving material production rate of the paving material plant and corresponding to the worksite,
receive environmental information including at least one of weather information associated with a travel path extending from the paving material plant to the worksite, and traffic information associated with the travel path, and
determine an initial delivery rate of paving material to be delivered from the paving material plant, wherein the initial delivery rate comprises an expected delivery rate determined based on the paving system information and the environmental information.

16. The paving system of claim 15, wherein the system controller is further configured to:
determine an initial paving machine speed based on a cut area of the work surface and the initial delivery rate, and
provide the initial paving machine speed to the paving machine controller via the network, the paving machine controller being configured to cause the paving machine to travel at the initial paving machine speed while depositing paving material within the cut area.

17. A control system, comprising:
a location sensor configured to determine a location of a haul truck;
a paving machine controller disposed on a paving machine located at a worksite;
a system controller; and
a network configured to transmit signals between the location sensor, the paving machine controller, and the system controller, wherein the system controller is configured to:
receive a signal from the location sensor and via the network, the signal including information indicating a location of the haul truck determined by the location sensor,
determine, based on the signal, a delivery rate of paving material being delivered from a paving material plant to the worksite by the haul truck,
determine a plurality of paving machine speeds, wherein at least one speed of the plurality of paving machine speeds is determined based on the delivery rate,
determine a desired paving machine speed based on a lowest speed of the plurality of paving machine speeds, and
provide the desired paving machine speed to the paving machine controller via the network, the paving machine controller being configured to cause the paving machine to travel at the desired paving machine speed while depositing paving material on a work surface of the worksite.

18. The control system of claim 17, wherein the desired paving speed comprises an average speed, and the system controller is configured to:
determine the average speed, and
provide the average speed to the paving machine controller via the network.

19. The control system of claim 17, wherein the system controller is further configured to:
determine that the desired paving machine speed is less than a threshold speed, and
provide an alert to the to the paving machine controller, via the network, based on determining that the desired paving machine speed is less than the threshold speed, the paving machine controller being configured to output the alert via a display device of the paving machine.

20. The control system of claim 17, wherein the at least one speed comprises a first speed, a second speed of the plurality of paving machine speeds is determined based on a maximum compaction rate of a compaction machine following the paving machine at the worksite, and a third speed of the plurality of paving machine speeds is determined based on a current paving material production rate of the paving material plant and corresponding to the worksite.

* * * * *